US009628533B2

(12) United States Patent
Denoual et al.

(10) Patent No.: US 9,628,533 B2
(45) Date of Patent: Apr. 18, 2017

(54) METHOD AND DEVICE FOR GENERATING A DESCRIPTION FILE, AND CORRESPONDING STREAMING METHOD

(71) Applicant: CANON KABUSHIKI KAISHA, Tokyo (JP)

(72) Inventors: Franck Denoual, Saint Domineuc (FR); Frédéric Maze, Langan (FR); Hervé Le Floch, Rennes (FR)

(73) Assignee: CANON KABUSHIKI KAISHA, Tokyo (JP)

( * ) Notice: Subject to any disclaimer, the term of this patent is extended or adjusted under 35 U.S.C. 154(b) by 544 days.

(21) Appl. No.: 14/025,489

(22) Filed: Sep. 12, 2013

(65) Prior Publication Data

US 2014/0082054 A1    Mar. 20, 2014

(30) Foreign Application Priority Data

Sep. 14, 2012    (GB) .................................. 1216420.8

(51) Int. Cl.
| | | |
|---|---|---|
| G06F 15/16 | (2006.01) | |
| H04L 29/06 | (2006.01) | |
| H04N 21/643 | (2011.01) | |
| H04N 21/647 | (2011.01) | |
| H04N 21/845 | (2011.01) | |
| H04N 21/854 | (2011.01) | |
| H04N 21/858 | (2011.01) | |
| G11B 27/034 | (2006.01) | |

(Continued)

(52) U.S. Cl.
CPC .......... *H04L 65/601* (2013.01); *G11B 27/034* (2013.01); *H04N 21/64322* (2013.01); *H04N 21/64792* (2013.01); *H04N 21/845* (2013.01); *H04N 21/8583* (2013.01); *H04N 21/85406* (2013.01); *H04N 19/25* (2014.11); *H04N 19/33* (2014.11)

(58) Field of Classification Search
CPC ................. H04N 21/84; H04N 21/845; H04N 21/85406; H04N 21/8545; H04N 21/8583; H04N 21/64322; H04N 21/64792; H04N 21/258; H04N 21/472; H04N 21/4516; H04N 19/23; H04N 19/25; H04N 19/31; H04N 19/33; G11B 27/034; H04L 65/602
USPC ......... 709/231, 247; 707/E17.028, 693, 755; 725/9; 715/200, 202-203
See application file for complete search history.

(56) References Cited

U.S. PATENT DOCUMENTS

| | | | | |
|---|---|---|---|---|
| 6,665,423 B1 * | 12/2003 | Mehrotra | ............. | H04N 19/543 375/E7.087 |
| 7,870,575 B2 * | 1/2011 | Spio | ...................... | H04N 7/165 725/28 |

(Continued)

*Primary Examiner* — Viet Vu
*Assistant Examiner* — Michael A Chambers
(74) *Attorney, Agent, or Firm* — Canon USA, Inc. IP Division

(57) ABSTRACT

The present invention relates to a method and device for generating a description file about a video sequence at a server device for a client device, to retrieve a video segment and containing a region of interest. The method comprising for each video segment, determining a time interval during which the detected region of interest is spatially included in a same frame region in the video sequence; and generating a description file comprising spatial information describing the frame region and temporal information describing a duration at least equal to the determined time interval.

35 Claims, 10 Drawing Sheets

(51) Int. Cl.
*H04N 19/25* (2014.01)
*H04N 19/33* (2014.01)

(56) References Cited

U.S. PATENT DOCUMENTS

| | | | | |
|---|---|---|---|---|
| 8,196,032 B2* | 6/2012 | Hua | ............... | G11B 27/034 |
| | | | | 715/200 |
| 8,462,152 B2* | 6/2013 | Rose | ............... | G06T 13/00 |
| | | | | 345/420 |
| 8,582,662 B2* | 11/2013 | Kozica | ............ | H04N 21/23439 |
| | | | | 375/240.25 |
| 2003/0212993 A1* | 11/2003 | Obrador | ............ | H04N 21/4117 |
| | | | | 725/9 |
| 2004/0098398 A1* | 5/2004 | Ahn | ............... | G06F 17/30017 |
| 2005/0175246 A1* | 8/2005 | Base | ............... | H04N 19/105 |
| | | | | 382/236 |
| 2007/0195880 A1* | 8/2007 | Henocq | ............... | H04N 19/159 |
| | | | | 375/240.13 |
| 2007/0239881 A1* | 10/2007 | Schneider | ............... | H03M 7/30 |
| | | | | 709/231 |
| 2008/0130739 A1* | 6/2008 | Le Floch | ............... | H04L 29/06 |
| | | | | 375/240.01 |
| 2008/0144725 A1* | 6/2008 | Henocq | ............... | H04N 5/765 |
| | | | | 375/240.27 |
| 2009/0041132 A1* | 2/2009 | Le Floch | ............... | H04N 7/0135 |
| | | | | 375/240.26 |
| 2009/0254798 A1* | 10/2009 | Gisquet | ............... | H04L 1/0045 |
| | | | | 714/819 |
| 2009/0262836 A1* | 10/2009 | Le Floch | ............ | H04N 21/6375 |
| | | | | 375/240.26 |
| 2010/0125581 A1 | 5/2010 | Peleg et al. | | |
| 2011/0252454 A1* | 10/2011 | Emura | ............... | H04N 21/242 |
| | | | | 725/114 |
| 2012/0134413 A1 | 5/2012 | Puri et al. | | |
| 2013/0069806 A1* | 3/2013 | Oh | ............... | H04N 21/2353 |
| | | | | 341/95 |
| 2014/0040500 A1* | 2/2014 | Zheng | ............... | H04L 65/4069 |
| | | | | 709/231 |

* cited by examiner

```
01  <?xml version="1.0"?>
02  <MPD type="static" minBufferTime="PT1.2S" profiles="urn:mpeg:dash:profile:isoff-on-demand:2011">
03    <BaseURL>http://www.example.com/</BaseURL>
04    <Period start="start_i" duration="start_j – start_i"> <!-- -->
05    <AdaptationSet mimeType="video/mp4" codecs="hevcX.XXXX,lccX.XXXXX" subsegmentAlignment="true"
06  subsegmentStartsWithSAP="2">
07      <!-- The base Layer (in HD) -->
08      <Representation id="1" bandwidth="2000000" width="1920" height="1080">
09        <BaseURL>segment_i1.mp4</BaseURL>
10      </Representation>
11      <Representation id="2" dependencyId="1" bandwidth="50000" width="3840" height="2160" region="480,0,480,270">
12        <BaseURL>segment_i2.mp4</BaseURL>
13      </Representation>
14    </AdaptationSet>
15    </Period>
16    <Period start="start_j" duration="start_k– start_j"> <!-- -->
17    <AdaptationSet ...>
18      <!-- The base Layer (in HD) -->
19      <Representation id="3" bandwidth="2000000" width="1920" height="1080">
20        <BaseURL>segment_j1.mp4</BaseURL>
21      </Representation>
22      <Representation id="4" dependencyId="3" bandwidth="52000" width="3840" height="2160" region="480,0,480,405">
23        <BaseURL>segment_j2.mp4</BaseURL>
24      </Representation>
25    </AdaptationSet>
26    </Period>
27    <Period start="start_k">       <!-- -->
28    <AdaptationSet ...>
29      <!-- The base Layer (in HD) -->
30      <Representation id="5" bandwidth="2000000" width="1920" height="1080">
31        <BaseURL>segment_k1.mp4</BaseURL>
32      </Representation>
33      <Representation id="6" dependencyId="5" bandwidth="52000" width="3840" height="2160"
34  region="960,135,480,405">
35        <BaseURL>segment_k2.mp4</BaseURL>
36      </Representation>
37    </AdaptationSet>
38    </Period>
39  </MPD>
```

Fig. 9

METHOD AND DEVICE FOR GENERATING A DESCRIPTION FILE, AND CORRESPONDING STREAMING METHOD

CROSS-REFERENCE TO RELATED APPLICATIONS

This application claims the benefit under 35 U.S.C. §119 (a)-(d) of United Kingdom Patent Application No. 1216420.8, filed on 14 Sep. 2012 and entitled "Method and device for generating a description file, and corresponding streaming method".

The above cited patent application is incorporated herein by reference in its entirety.

FIELD OF THE INVENTION

The invention relates to a method and a device for generating and transmitting a description file (also called manifest file) associated with a video and more particularly with Web-accessed compressed videos.

BACKGROUND OF THE INVENTION

The technological context of the invention is the W3C HTML5 framework and also adaptive HTTP streaming (for example: 3GPP/MPEG/DASH, Apple HLS, Microsoft Smooth Streaming) to interact with videos on the Web. Currently these streaming approaches focus on temporal access, scalability layers access or multi-view access.

The streaming solutions mentioned above are client-based also called pull-based approaches and rely on the transmission from a server of a manifest file that describes a media resource in terms of segments to download. After processing the manifest, the client is then able to request (polling requests) the segments of interest (either a given scalability layer, a specific temporal interval . . . ). The manifest content depends on how the media resource to be streamed is organized. The organization of the media resource is also called encapsulation and consists in indexing the media resource, for example in terms of scalability layers and/or audio vs. video tracks, in terms of temporal fragments, etc. . . .

One of the most famous encapsulation formats is the mp4 format, the MPEG-4 Part 12 standard, also called ISO Base Media File Format. In 2010-2011, following the standardization of 3GPP/MPEG/DASH, this file format has been updated to comply with dynamic adaptive streaming on HTTP.

Typically, the notion of segments has been defined with specific headers for the indexation of segments (and even sub-segments).

A media resource such as video can be represented by a list of URLs. It enables the client to be informed on the addressable parts of the video. Each addressable part, typically a temporal segment, is described by one URL (for "Uniform Resource Locator"). This URL points to an mp4 segment file or to a byte range inside an mp4 file. This can be used for adaptation purpose, and/or to progressively download the video by successively downloading the consecutive temporal segments. To this end, the pull mechanism has been elaborated in which the client performs a list of HTTP requests on consecutive segments to be able to watch the full video.

The invention focuses on some specific applications which allow interacting with clickable videos on the Web. For instance they allow users to click onto a video frame area to zoom in on a particular region of interest. The invention concerns in particular the zooming application for compressed video, more specifically how to retrieve the video frame portions corresponding to the zoomed region of interest, in this technological context of HTTP streaming. This requires spatial access into compressed videos and a solution to package the videos to be streamed in a way that these spatial areas can be addressed by streaming clients.

The solution has to take into account that the number of polling requests from the client should be kept small, so that the streaming remains efficient in term of latency and overhead (the more requests/responses there are, the more header overhead information will be exchanged and processed). In addition, the solution has to limit data overhead transmitted on the network (i.e. the ratio between requested data by the client and streamed data sent by the server corresponding to the zoomed region).

The U.S. Pat. No. 7,870,575 (Boeing) discloses a media distribution system in which media programs are segmented into a plurality of media segments depending on some attributes values. Those attribute values concern for example movie rating, classification (adult only, all public . . . ). A description file provides a mapping between attributes values and media segments for conditional access.

However, the Boeing solution cannot be used for solving the problem mentioned above for many reasons.

Firstly, the Boeing solution is not intended to limit the number of client HTTP requests, since the context is content broadcasting rather than client-based streaming.

Secondly, attributes are additional metadata which excludes portions of a frame of the video. Indeed the Boeing patent does not provide a spatial access method. Consequently, the Boeing patent does not propose any solution for transmitting these frame portions since their solution only consists in sending temporal segments of the full video, those segments being associated to the same selected attribute.

SUMMARY OF THE INVENTION

The present invention has been devised to address one or more of the foregoing concerns.

According to a first aspect of the invention there is provided a method for generating a description file about a video sequence at a server device for a client device, to retrieve a video segment and containing a region of interest, the method comprising for each video segment:

determining a time interval during which the detected region of interest is spatially included in a same frame region in the video sequence; and generating a description file comprising spatial information describing the frame region (in particular the possible spatial access to said region of interest) and temporal information describing a duration at least equal to the determined time interval.

According to this first aspect of the invention, there is provided a simple and efficient method to transmit regions of interest from a server to a client in a minimum number of requests in a compressed video on the Web. Thanks to the description file, the solution provides some flexibility, given that the time interval which is determined is the one during which the region of interest is spatially included in a same frame region. Moreover, the generated description file also provides some flexibility thanks to a simple syntax associated to a time interval.

According to a particular embodiment, the method may further comprise:
- a preliminary detecting step wherein the position of the region of interest in each frame of the video sequence is detected, by using an object content recognition method, and
- an encapsulating step wherein the video sequence is encapsulated based on the region of interest's position and the corresponding time interval.

Still according to a particular embodiment, the method further comprises a coding step for compressing the video sequence, occurring before the encapsulating step.

As a variation, the method may further comprise a coding step for compressing the video sequence, occurring at the same time as the encapsulating step.

According to a particular embodiment, the step of determining a time interval may comprise:
- determining a start frame in the video sequence in which the region of interest is spatially included in the frame region;
- determining an end frame in the video sequence corresponding to the last frame in which the region of interest is still spatially included in the same frame region, all the consecutive frames between the start and the end frames having the region of interest spatially included in the same frame region;
- determining start and end bounds of the determined time interval corresponding to the timing of the determined start and end frames.

Still according to a particular embodiment, the step of determining the end frame may comprise considering each frames following the start frame one by one, and for the considered frame:
- a) comparing the position of the region of interest in the considered frame with the position of the corresponding region of interest in the previous frame, and
- b)
  - if the compared positions of the region of interest are substantially the same then repeating the steps a) and b) with the following frame,
  - else if the compared positions are different, then the considered frame is the end frame of the current video segment.

Still according to a particular embodiment, the frame region may correspond to the smallest region including the region of interest in the start frame.

Still according to a particular embodiment, the determined time interval may correspond to the longest duration during which the region of interest is included in the frame region.

Still according to a particular embodiment, the temporal information may include start time bound and end time bound of the duration.

Still according to a particular embodiment, the spatial information may include spatial coordinates of the frame region.

Still according to a particular embodiment, the video sequence may be encoded by independently decodable tiles, and wherein the spatial information includes index of the tiles covered by the region of interest.

The use of the tiles provides a simple and optimized way to spatially access the regions of interest among a frame.

Still according to a particular embodiment, the method further comprising determining at least one additional time interval during which the region of interest overlaps outside the frame region by a predetermined fraction amount and wherein the duration described by the temporal information is the sum of the time interval and the additional time intervals.

Still according to a particular embodiment, said predetermined amount may be a fraction of the region of interest inferior or equal to a predetermined threshold.

In other words, a region of interest can be considered as being included in the same frame is this frame does not change except for a small frame region ratio which is predefined (for instance, less than 25%).

This fraction allows limiting the number of time intervals by not creating a new one each time that a very small portion of a tile is covered by the considered region of interest.

Still according to a particular embodiment, a tile may be considered as being covered by a given region of interest if at least a predetermined number of successive frames comprising said given region of interest, include said tile.

This embodiment introduces some flexibility in the determination of the time interval.

Still according to a particular embodiment, the video sequence may be a scalable video sequence, comprising one base layer and at least one enhancement layer.

Still according to a particular embodiment, the video sequence may be a scalable video sequence, comprising one base layer and at least one enhancement layer which is encoded by independently decodable tiles.

Still according to a particular embodiment, the video may comprise at least two independent bitstreams, a first bitstream with a lower resolution and a second bitstream with a higher resolution and which is encoded by independently decodable tiles.

In other words, the method according to the invention is a method of generating a description file for a client device to retrieve a video segment containing a region of interest from a video sequence at a server device. The method comprises:
- determining a first time interval in the video sequence during which the region of interest is spatially included in a same frame region; and
- generating a description file comprising spatial information describing the frame region and temporal information describing a duration at least equal to the first time interval.

According to a particular embodiment, the determined time interval corresponds to the longest duration during which the region of interest is included in the frame region.

Still according to a particular embodiment, the method comprises determining a second time interval in the video sequence during which the region of interest overlaps outside the frame region by a predetermined fraction amount and wherein the duration described by the temporal information is the sum of the first and the second time intervals.

Said differently, a time interval consists of two temporal parts:
- a first part when the region of interest is strictly comprised in the same frame region, and
- a second part when the region of interest is comprised in the said frame region and an additional fraction amount which is inferior to a predetermined threshold.

This allows limiting the number of determined time intervals and consequently limiting the number of client's requests to retrieve the video segments.

According to a second aspect of the invention, there is provided a method for streaming video data corresponding to a video sequence from a server device to a client device. The method comprises:

receiving a first request from a client device requesting a description file about the video sequence, which comprises spatial and temporal information about the video sequence, generating a description file as mentioned above, transmitting the generated description file to the client, receiving a second request from the client device, requesting a video segment based on the information contained in the transmitted description file, and streaming the video segment to the client device.

According to an embodiment, the description file is generated off-line by the server.

According to a third aspect of the invention, there is provided a server device for streaming video data corresponding to a video sequence to a client device. The server device comprises:

receiving means for receiving a first request from a client device requesting a description file about the video sequence, which comprises spatial and temporal information about the video sequence, generating means for generating a description file as mentioned above, transmitting means for transmitting the generated description file to the client, receiving means for receiving a second request from the client device, requesting a video segment based on the information contained in the transmitted description file, and streaming means streaming the video segment to the client device.

According to a fourth aspect of the invention, there is provided a computer program for a programmable apparatus, the computer program comprises instructions for carrying out each step of the method as mentioned above, when the program is loaded and executed by a programmable apparatus.

According to a fifth aspect of the invention, there is provided a computer readable storage medium storing instructions of a computer program for carrying out each step of the method as mentioned above.

According to a sixth aspect of the invention, there is provided a device for generating a description file about a video sequence at a server device for a client device, to retrieve a video segment and containing a region of interest. The method comprises for each video segment:

determining means for determining a time interval during which the detected region of interest is spatially included in a same frame region; and generating means for generating a description file comprising spatial information describing the frame region and temporal information describing a duration at least equal to the determined time interval.

According to a particular embodiment, the device may further comprise:

detecting means for preliminary detecting where the position of each region of interest in each frame of the video sequence is, by using an object content recognition method, and encapsulating means for encapsulating the video sequence based on the region of interest's position and the corresponding time interval.

According to a particular embodiment, the device may further comprise coding means for compressing the video sequence, the compression occurring before the encapsulation realized by the encapsulating means.

As a variation, the device may comprise coding means for compressing the video sequence, the compression occurring at the same time as the encapsulation realized by the encapsulating means.

According to a particular embodiment, the determining means for determining a time interval further comprises:

first determining means for determining a start frame in the video sequence in which the region of interest is spatially included in a frame region;

second determining means for determining an end frame in the video sequence corresponding to the last frame in which the region of interest is still spatially included in the same frame region, all the consecutive frames between the start and the end frames having the region of interest spatially included in the same frame region;

third determining means for determining start and end bounds of the determined time interval corresponding to the timing of the determined start and end frames.

Still according to a particular embodiment, the determining means for determining the end frame may be able to consider each frame following the start frame one by one, and may further comprise comparing means for comparing the position of the region of interest in the considered frame with the position of the corresponding region of interest in the previous frame.

Still according to a particular embodiment, the frame region may correspond to the smallest region including the region of interest in the start frame.

Still according to a particular embodiment, the determined time interval may correspond to the longest duration during which the region of interest is included in the frame region.

Still according to a particular embodiment, the temporal information may include start time bound and end time bound of the duration.

Still according to a particular embodiment, the spatial information may include spatial coordinates of the frame region.

Still according to a particular embodiment, the video sequence may be encoded by independently decodable tiles, and wherein the spatial information includes index of the tiles covered by the region of interest.

Still according to a particular embodiment, the device may further comprises determining means for determining at least one additional time interval during which the region of interest overlaps outside the frame region by a predetermined fraction amount and wherein the duration described by the temporal information is the sum of the time interval and the additional time intervals.

Still according to a particular embodiment, said predetermined amount may be a fraction of the region of interest inferior or equal to a predetermined threshold.

Still according to a particular embodiment, a tile may be considered as being covered by a given region of interest if at least a predetermined number of successive frames comprising said given region of interest, include said tile.

Still according to a particular embodiment, the video sequence may be a scalable video sequence, comprising one base layer and at least one enhancement layer.

Still according to a particular embodiment, the video sequence may be a scalable video sequence, comprising one base layer and at least one enhancement layer which is encoded by independently decodable tiles.

Still according to a particular embodiment, the video may comprise at least two independent bitstreams, a first bitstream with a lower resolution and a second bitstream with a higher resolution and which is encoded by independently decodable tiles.

BRIEF DESCRIPTION OF THE DRAWINGS

Other particularities and advantages of the invention will also emerge from the following description, illustrated by the accompanying drawings, in which:

FIG. 9 shows an example of a MPD for requesting segments based on region of interest, according to the invention.

DETAILED DESCRIPTION OF EMBODIMENTS OF THE INVENTION

Figure 1:
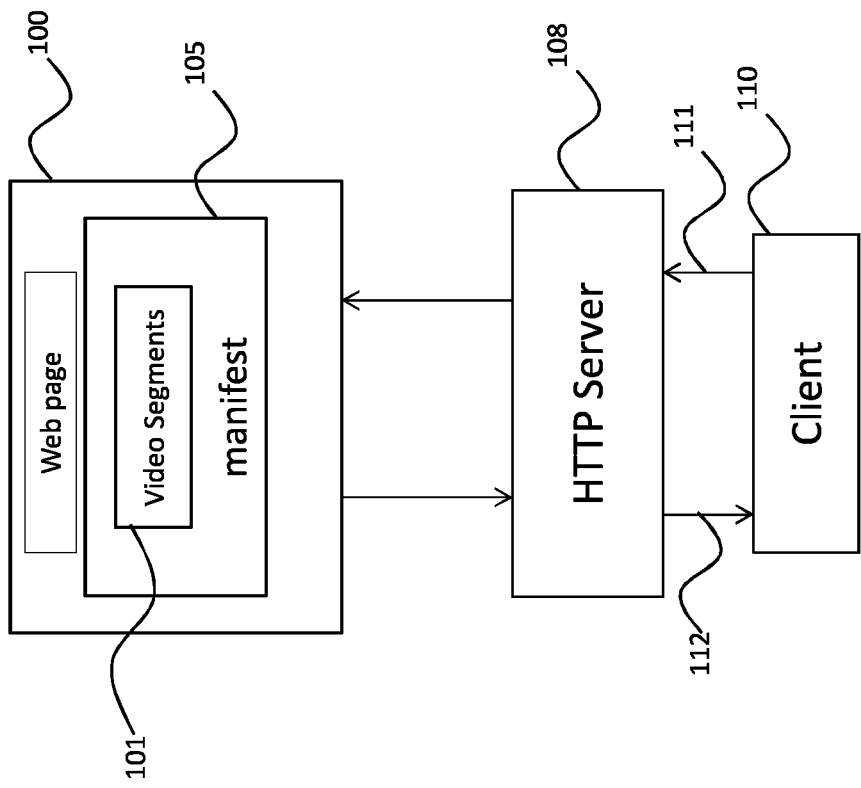
FIG. 1 shows an exemplified download of a video according to the present invention.

In FIG. 1 the download of a video and its associated manifest according to a preferred embodiment of the present invention is schematically depicted.

As shown, video segments 101 and their associated manifest 105 are referenced from a Web page 100, representing a Web application.

In the present embodiment, it is for example assumed that the video segments 101 are described in a manifest called Media Presentation Description or MPD 105 as specified by the 3GPP/MPEG/DASH standard. More particularly, these segments 101 may be generated in an mp4 format.

The Web page 100 is for example written in HTML5 and potentially embedding javascript code to enable users to interact with its contents. The Web page 100 is communicated by an HTTP server 108 to a client 110 through a communication network. Following the selection of a video segment referenced in the Web page, a request message 111 is sent by the client 110 in response to which the HTTP server streams the selected video segment 112. For instance, the client 110 is either an HTML5 player or a Web browser.

Figure 2:
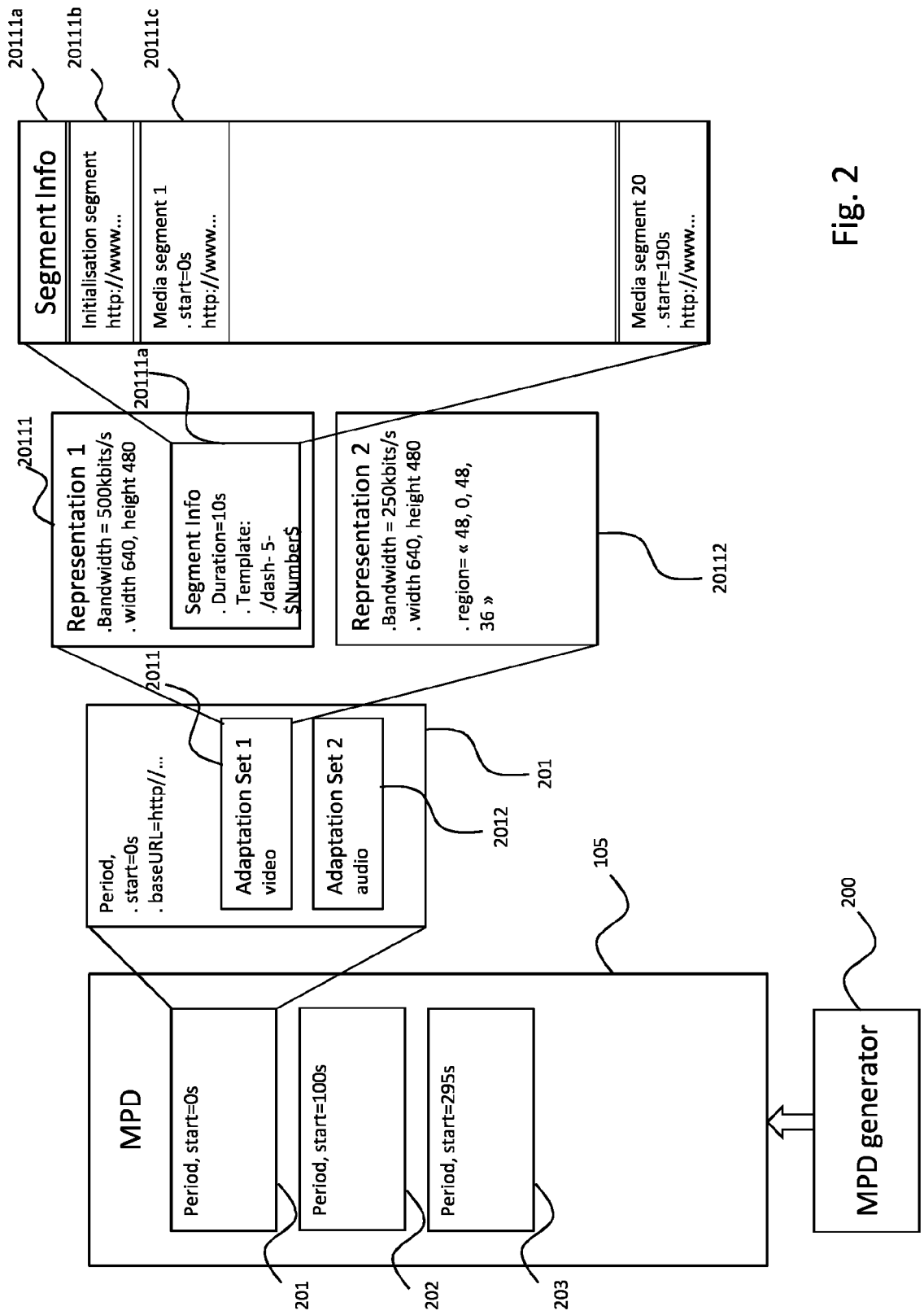
FIG. 2 illustrates an example of a description file following the 3GPP/MPEG/DASH standard: Media Presentation Description (MPD) according to the invention.

FIG. 2 illustrates an example of a MPD 105 according to the present embodiment of the invention. It is assumed here that the concerned video is a scalable video. The scalable video comprises a base layer and at least one enhancement layer which can be segmented, said segmentation being described in the MPD.

The MPD comprises several syntax elements names <Period> 201, 202, 203 . . . each one corresponding to a period, here defined by a start time (attribute "start=x s"). The period elements could also be defined with a duration attribute. The organization of the video into periods is realized by a MPD generator 200. The MPD generation process which is described more in detail below.

The <Period> element 201 is described more specifically here. The element is described by an URL named baseURL which allows the client to retrieve the base layer for the considered time period. In addition several "adaptation set" elements are incorporated: one for video description 2011 and one for audio description 2012. Each adaptation set is associated to a given track. In this example, the first group adaptation set 2011 is associated to the video track, and the second adaptation set 2012 is associated to the audio track corresponding to said video track for the considered time period.

FIG. 2 illustrates a possible adaptation set for the video track: each adaptation set corresponds to a particular representation of the video track. The first representation 20111 gets a bandwidth of 500 kbits/s, a width of 640 pixels and a height of 480 pixels. More parameters are given by the field "Segment Info" 20111a.

The second representation 20112 gets a bandwidth of 250 kbits/s, a width of 640 pixels and a height of 480 pixels. This representation is correlated to a particular portion or region of the frames of the video track, signalled with the "region" attribute that provides top left corner position followed by width and height. The spatial definition of this region is explained more in detail below.

The Segment Info field 20111a is detailed on the right part of the FIG. 2.

Figure 3:
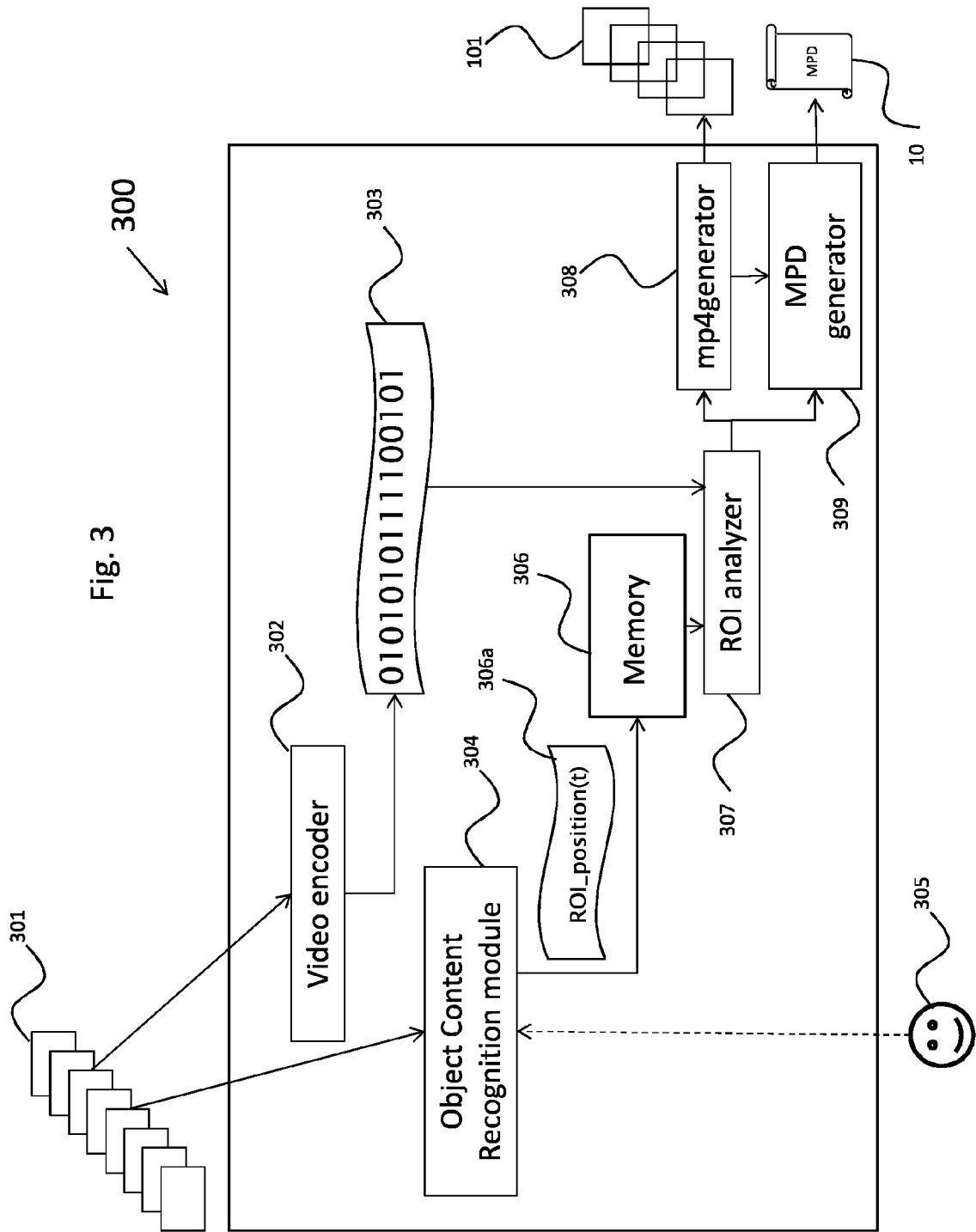
FIG. 3 illustrates a device able to generate a MPD, according to a preferred embodiment of the invention.

The Segment Info 20111a is made up of an initialization segment 20111b and one or more media segments 20111c. The Initialization segment 20111b contains decoder setup information while a media segment 20111c contains actual media data. As an example, for media presentation encapsulated in mp4, the initialization segment 20111b contains information on the fact that the presentation is fragmented (split into independently decodable fragments) and on the encoding of the media content (rate, duration, width, height, number of tracks . . . ). The media segment 20111c may contain the media data with timing information and access to data samples FIG. 3 shows an example of a device 300 according to an embodiment of the invention. In an embodiment, the device 300 could be a device independent from the HTTP server device 108. In this case, it is coupling before said server device. In another embodiment, the device 300 and the server device 108 could be one unique device. This embodiment may be used for a Web application when the user uploads a video, this video being segmented and streamed by the device 300/server device.

In this embodiment, the process implemented by the device 300 is done off-line, meaning before the user starts sending the requests.

In this embodiment the encapsulation of a video 301 is performed after a compression done by a video encoder 302.

This video encoder 302 takes as input the original video sequence 301 to generate a compact bitstream 303 that is compliant to a standard video compression format like for example H264 or HEVC, which could be with scalable extensions. The bitstream 303 is here considered as being a scalable bitstream made up of a base layer and of at least one spatial enhancement layer. As explained more in detail below, the spatial enhancement layer may be organized into independent tiles.

In this embodiment, the original video sequence 301 is also analysed by an object content recognition module 304. This module 304 can for example detect faces, follow moving characters or objects in the scene and generate either automatically or in a semi-automatic way by interactions with a user/client 305 potential regions of interest (ROI). The device 300, the video encoder 302 and the object content recognition module 304 can for example be embedded into a camera or a camcorder. The extracted regions of interest are stored as metadata information in a memory 306 and contain the position of the regions of interest along time ROI_position(t), 306a. Both bitstream 303 and metadata information 306a are provided as input of a ROI analyser module 307. This module compares from one frame to another the positions of each extracted ROI. In the case of a spatial enhancement layer of the compressed video that is organized into tiles, the tiles newly covered by the ROI are detected (in comparison to the previous frame). As a variation, the ROI analyser module 307 is able to compare the position of each extracted region of interest frame by frame by using the ROI's coordinates.

Figure 6:
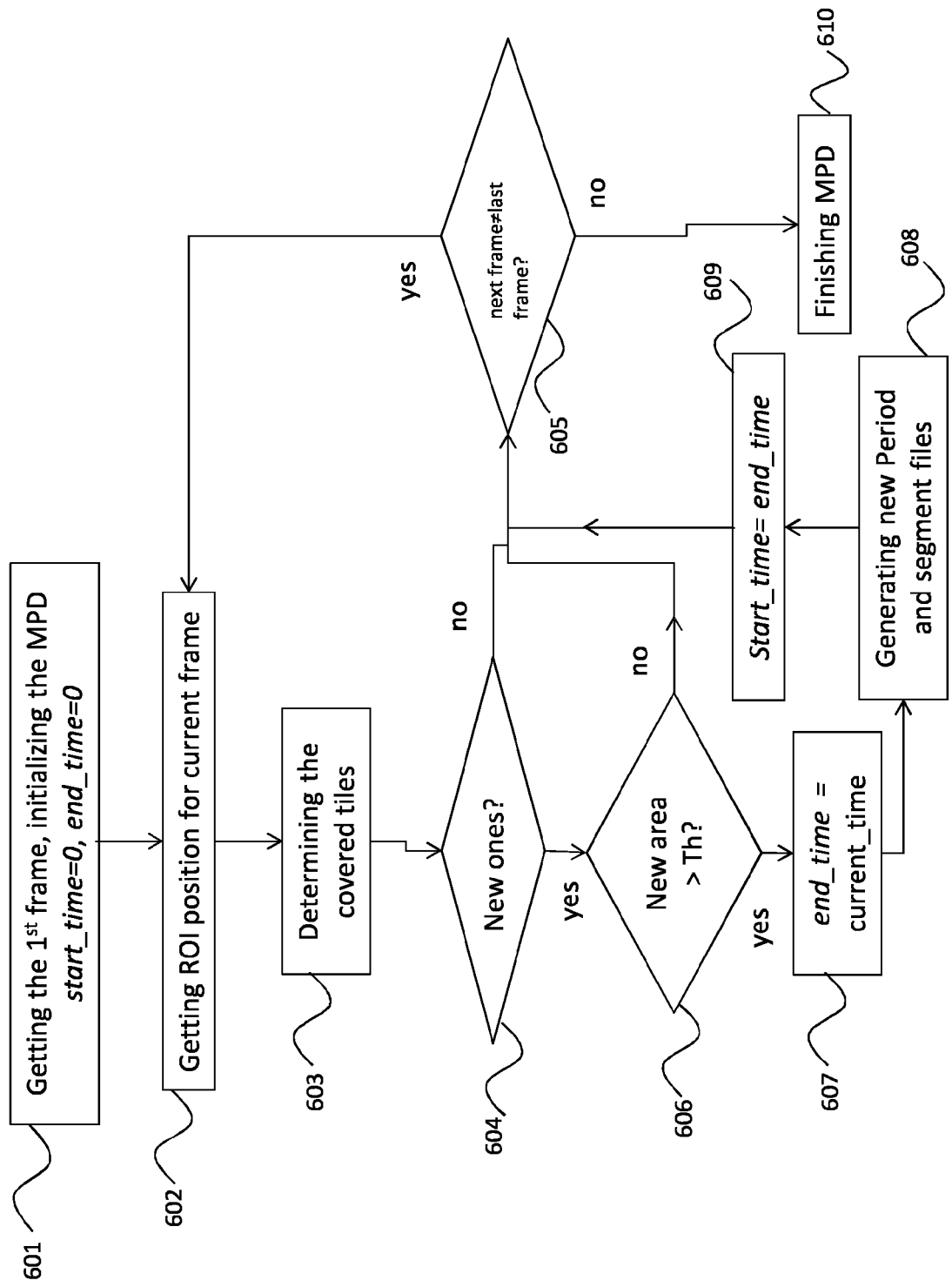
FIG. 6 shows a simplified block diagram which illustrates a method according to the invention.

An embodiment of the method implemented in the ROI analyser module 307 is detailed in the FIG. 6. The ROI analyser 307 deduces the best segment length and encapsulates video bitstream 303 taking into account the so-computed temporal decomposition and that provides access to the set of tiles covered by the regions of interest. The process for temporal segment generation is described for instance in MPEG4—Part 12 from ISO-BMFF.

This encapsulation is performed by an mp4 generator 308 to provide the downloadable mp4 segments 101. In parallel, a MPD generator 309 builds the corresponding description or manifest file: the MPD 105.

It has to be noticed that the analyser 307 can also be embedded in the camera or camcorder but can also run on a cloud server where the video and the ROI related metadata would have been uploaded by the user for distribution on the Web. Also to mention, the bitstream 303 can be an already encapsulated bitstream with or without segments 101 and associated MPD 105 that would be transformed by the analyser 307 into new segments 101 and associated MPD 105.

Figure 4:
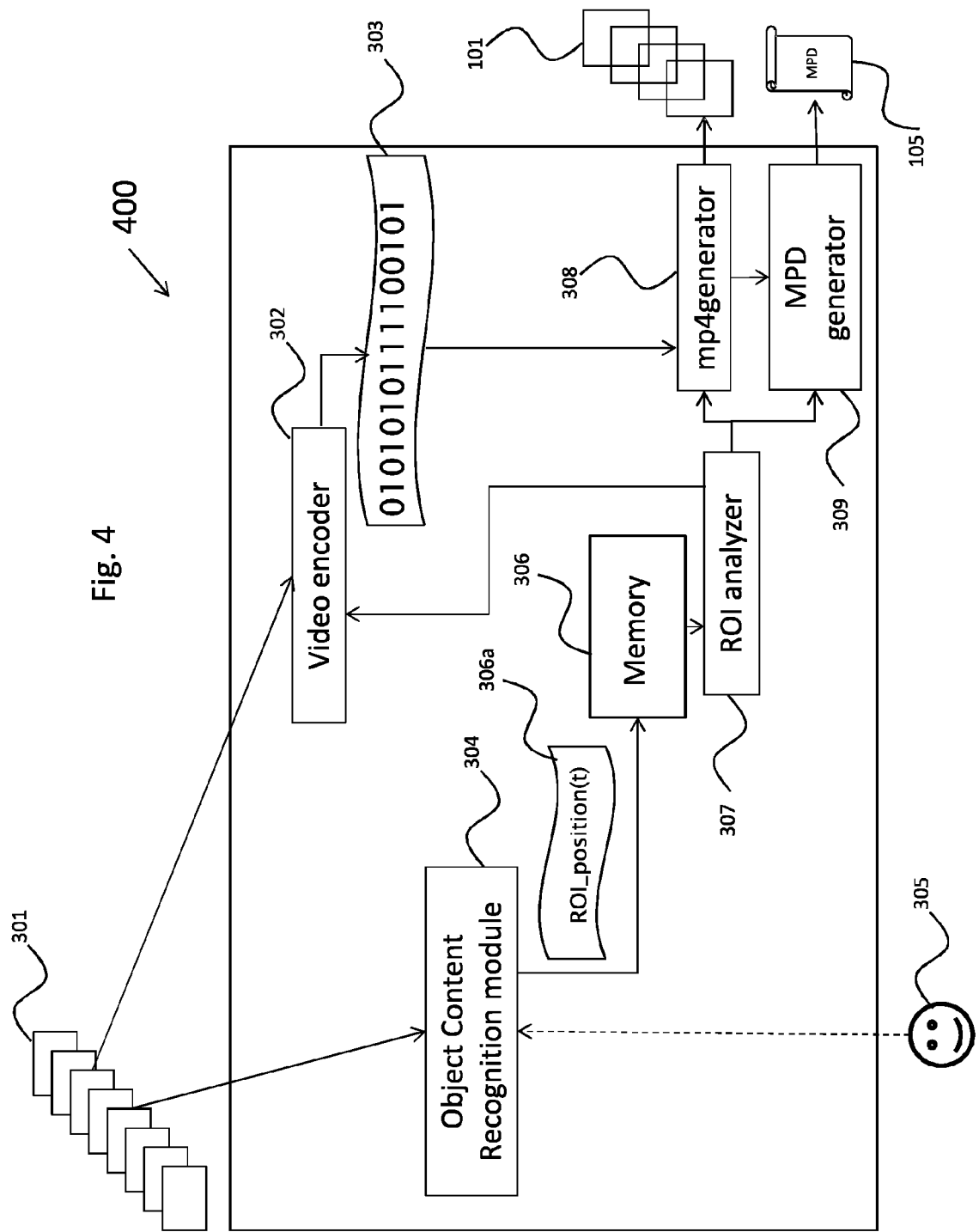
FIG. 4 illustrates a variation of a device able to generate a MPD, according to another preferred embodiment of the invention.

FIG. 4 illustrates a variation 400 of the device represented in the FIG. 3. In this variation the process of analyzing the ROI may act on the encoding of the video. The modules already mentioned previously keep the same references.

According to one embodiment, the device 400 is preferably embedded with the imaging device (camera or camcorder for example).

In this variation, the analysis implemented in the ROI analyser 307 is performed in parallel with the encoding realized by the video encoder 302 and could then act on encoding parameters, like for example forcing an intra-coded frame at each segment boundary.

Figures 5A, 5B:
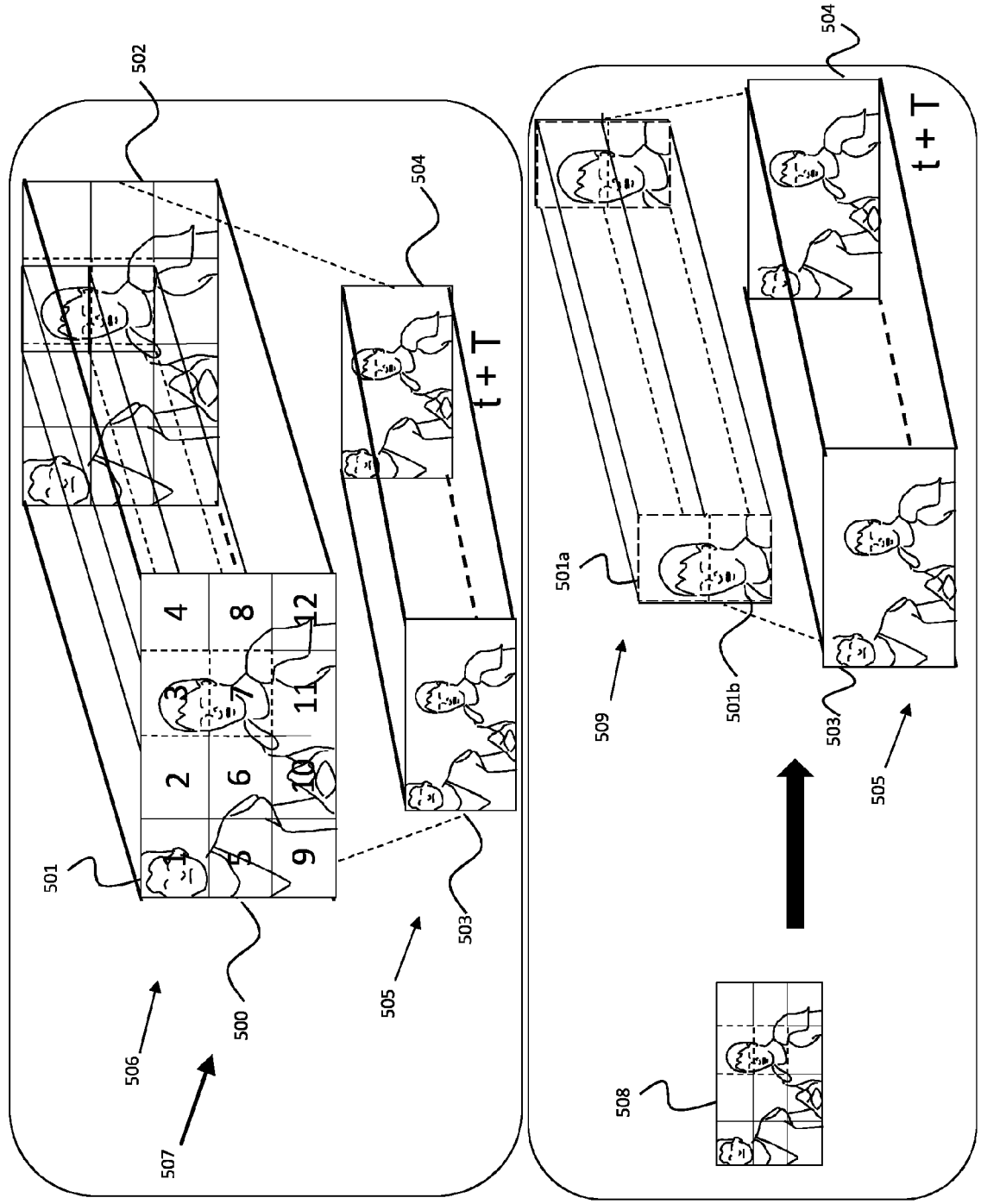
FIG. 5a illustrates an example of scalable video representation with tiles for spatial access in the highest resolution layer.
FIG. 5b illustrates in case of ROI (Region Of Interest) selection, the video data segments to transmit.

FIG. 5a illustrates a video segment on a period T. This video 507 is a compressed video comprising a base layer 505 which is for instance a base layer in HEVC format with a High Definition (HD) resolution. The first frame of the base layer segment is referenced 503 and the last frame 504.

The video also comprises a spatial enhancement layer 506 at 4k2k resolution encoded for example as a set of independently compressed tiles 501 (numbered 1 to 12 on the figure). The first frame of the enhancement layer segment is referenced 500 and the last frame 502.

An example of region of interest is illustrated: it covers two tiles 3 and 7 (tiles defined by dotted lines).

The base layer 505 is always transmitted to the client after receiving a request for retrieving the video frames. The spatial enhancement layer 506 is transmitted according to the bandwidth's availability or when a user decides to zoom into the video.

FIG. 5b represents a frame with a region of interest, here a framed character's face. This region of interest is selected by the user, for instance because he wants to zoom in on this region. In response to the user selection, the client device sends a request for retrieving this region of interest. The base layer segment 505 is sent for the period T. But only the portion 509 corresponding to the selected region of interest is sent instead of the whole enhancement layer in FIG. 5a. In this embodiment, the spatial access to the portion is provided by tiles. In the example, the region of interest covers two tiles 501a and 501b whose indexes are respectively "3" and "7". Those two tiles are encapsulated together to provide an addressable video segment. The generation of the segments is described more in detail on the following figures.

FIG. 6 illustrates an example of a method implemented in the ROI analyser 307 previously mentioned. This method allows constructing a video segment according to the invention.

On first step 601, a new MPD is initialized and prepared by the MPD generator 309 mentioned above. Two values, start_time and end_time maintained by by the ROI analyser, are initialized to 0. These values represent the time bounds for the current video segment under construction. It also allocates some memory for the storage of the set of tiles covered by the extracted regions of interest.

Then the positions for the ROIs defined in the first frame are determined by the analyser 307 at step 602. More specifically, they are obtained by reading the ROI position metadata information from memory 306 related to the first frame.

Then the set of tiles covered by each region of interest are determined at step 603. In a preferred embodiment, the tiles positions consist in a regular grid covering the whole frame. The tiles can be referenced by an index to signal their position within the grid. In such case, the mapping of ROI position to tile indexes is direct. In alternative embodiment where tiles would not consist in a regular grid, the grid positions would have to be signalled either via additional metadata accompanying the bitstream 303 or embedded into the bitstream 303 for example in extended SEI (for "Supplemental Enhancement Information") messages.

Next step 604 consists for the analyser 307 in checking whether the current set of tiles is different than the previous one, for instance by comparing the indexes of the covered tiles. If it is not the case, the analyser 307 moves to next frame at step 605 and loops until no more frames are available (the test made in step 605 is false).

If the set of tiles changed with this current frame (answer is yes to the test made in step 604), then decision has to be taken by the analyser 307 on whether to build a new segment or not. Building a new segment will provide better temporal granularity access but will decrease compression performance (especially in case of a live analysis process is implemented because the encoder may encode the corresponding frame in Intra mode). Also to consider at this step, the fact that the shorter the segment is, the greater the number of HTTP requests/responses will be necessary to stream the video. Thus the analyser 307 does not automatically create new segments when the set of covered tiles changes in a low proportion.

Thus at step 606, the ratio between the portion of the tiles that the ROI newly covers, regarding the whole size of these new tiles is compared to a threshold Th. In case of live analysis, this is the portion of the newly covered tiles regarding the encoded size of the corresponding new covered tiles which is compared to the threshold Th. This threshold Th is preferably expressed in terms of a ratio of coverage of new tiles (ex: 25%). As a variation the ratio could also be a minimal duration for the segments including the newly covered tiles regarding the video segment length. In other words, for a current frame with new tiles covered, if the current segment under construction does not reach a minimal length, a new segment will not be created and the frame will be appended in the current segment under construction. This threshold Th actually provides a trade-off between the HTTP roundtrips to access the ROI and the overhead of information sent for a region of interest. Indeed, when requesting a region of interest, the covered set of tiles is transmitted. If each newly covered tile would imply a new video segment even if the newly covered portion is very low, the number of generated segments would significantly increase, and so would the number of HTTP requests/responses. When a non-significant part of a tile is covered, it is not optimal to send this tile and it is better to wait until a more significant coverage is reached. The impact of the missing portion of the region of interest is acceptable compared to the bandwidth gain.

If the threshold Th is reached (the test undertaken in step 606 is true), the analyser 307 updates its end_time to current_time during the step 607. It signals at step 608, to the mp4 generator 308 to terminate the current segment and to the MPD generator 309 to terminate the current Period element of the description.

These are the objects of step 608 and current start time and end time are used in indexing information of the segments and in the description of the Period in the MPD (start and duration attributes for example). After that, the analyser 307 sets its start_time to end_time, step 609, and the MPD generator 309 initiates a new Period elements and the mp4 generator prepares a next segment file. Then, the analyser 307 moves to the next frame (if present, see test 605) and iterates until no more frames are to be processed, step 610. At the end of the video sequence, the description file (MPD) is finalized (step 610) by the MPD generator 309. It consists in closing the current Period element in term of XML syntax as well as the root MPD element, so that the MPD is well-formed and valid with respect to XML syntax and the MPD scheme.

Another embodiment may consist in creating a new element in a single Period, instead of considering various (or multiple) Period elements. With this aim in view, an element called "SegmentList" element is used. The "SegmentList" element allows describing the tile representation, as an alternative of the embodiment which uses multiple Period elements and "BaseURL" elements (904, 908, 912). More precisely, the SegmentList element allows accessing the tile data on the different computed time intervals. Then, each time step 608 is reached, a new "SegmentURL" element is appended to the "SegmentList" element with the appropriate URL to reach the segment. Of course, in this embodiment this would require a syntax extension related to the new region attribute to be placed on the "SegmentURL" element (it is well known by the man skilled in the art that the MPD schema allows extension of this element in terms of attribute).

Figure 7:
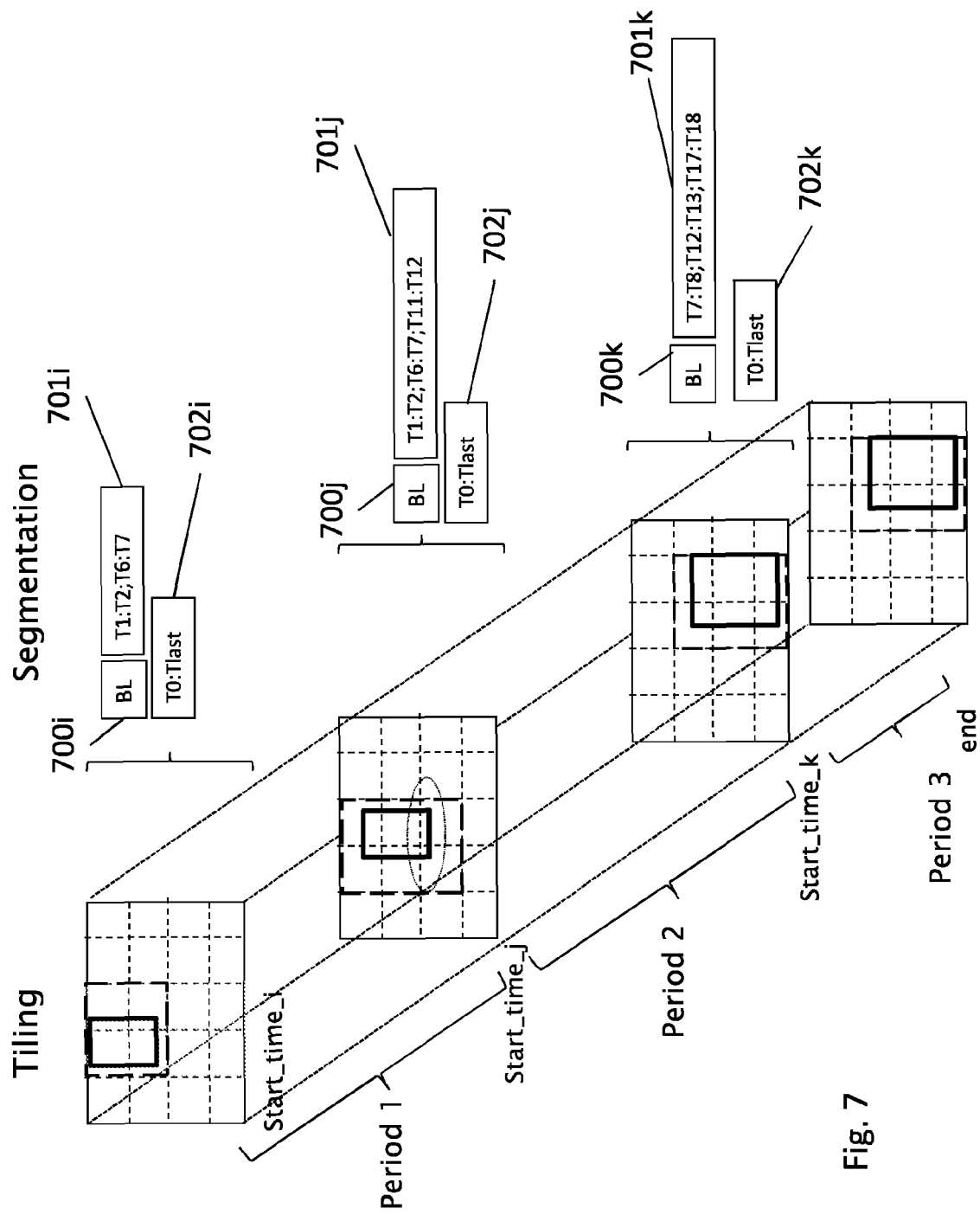
FIG. 7 shows a simplified diagram for explaining the generation of the segments for a tiled video, according to an embodiment of the invention.

The segment creation for scalable video implemented in step 608 is illustrated in FIG. 7. More particularly, this figure illustrates the tile organisation in the spatial enhancement layer of the compressed video. On top of these tiles, there is one region of interest (for simplicity only one ROI is represented in bold lines, but of course the implementation works also in case of multiple regions of interest) and the set of covered tiles that should be transmitted (tiles framed by a bold dashed line).

The results provided by the ROI analysis module 307 are the Period 1 and Period 2 that have been detected, respectively from frame i to j and from frame j to k, based on the ratio of newly covered area in the new tiles (ex: with frame at time j) as explained in previous paragraph. The first period Period 1 is bounded by Start_time_i and Start_time_j. The second Period is bounded by Start_time_j and Start_time_k.

FIG. 7 highlights the segment organization reflecting the mapping of ROI with respect to the tiles. For example, in a preferred embodiment, from frame i to frame j, i.e. Period 1, the mp4 generator 308 builds three segments files that respectively correspond to compressed data for the base layer frames respectively 700i, 700j and 700k, compressed data for tiles only covered by the ROI respectively 701i, 701j and 701k and compressed data for the whole spatial enhancement layer frames respectively 702i, 702j and 702k.

Thus if the client will to get only the ROI data for the Period 1, only the base layer segment 700i and the ROI tiles segment 701i are downloaded.

If the user will to get to get only the ROI data for the Period 2, only the base layer segment 700j and the ROI tiles segment 701j are downloaded.

In a more general case, meaning no ROI data are requested during the Period 1 and the Period 2, only the base layer data 700i and 700j and the whole spatial enhancement layer frames 702i ans 702j are transmitted. 700k segments would be downloaded for a Period 3, from start_time_k to the end of the sequence.

In other words, if the user keeps on watching the video through the ROI after start time j, the streaming client device will download the data from base layer segment 700 and the tile data from enhancement layer 701 that correspond to the new ROI position. Then after start time k, the client device would download the segments corresponding to the following Period (not represented here).

Figure 8:
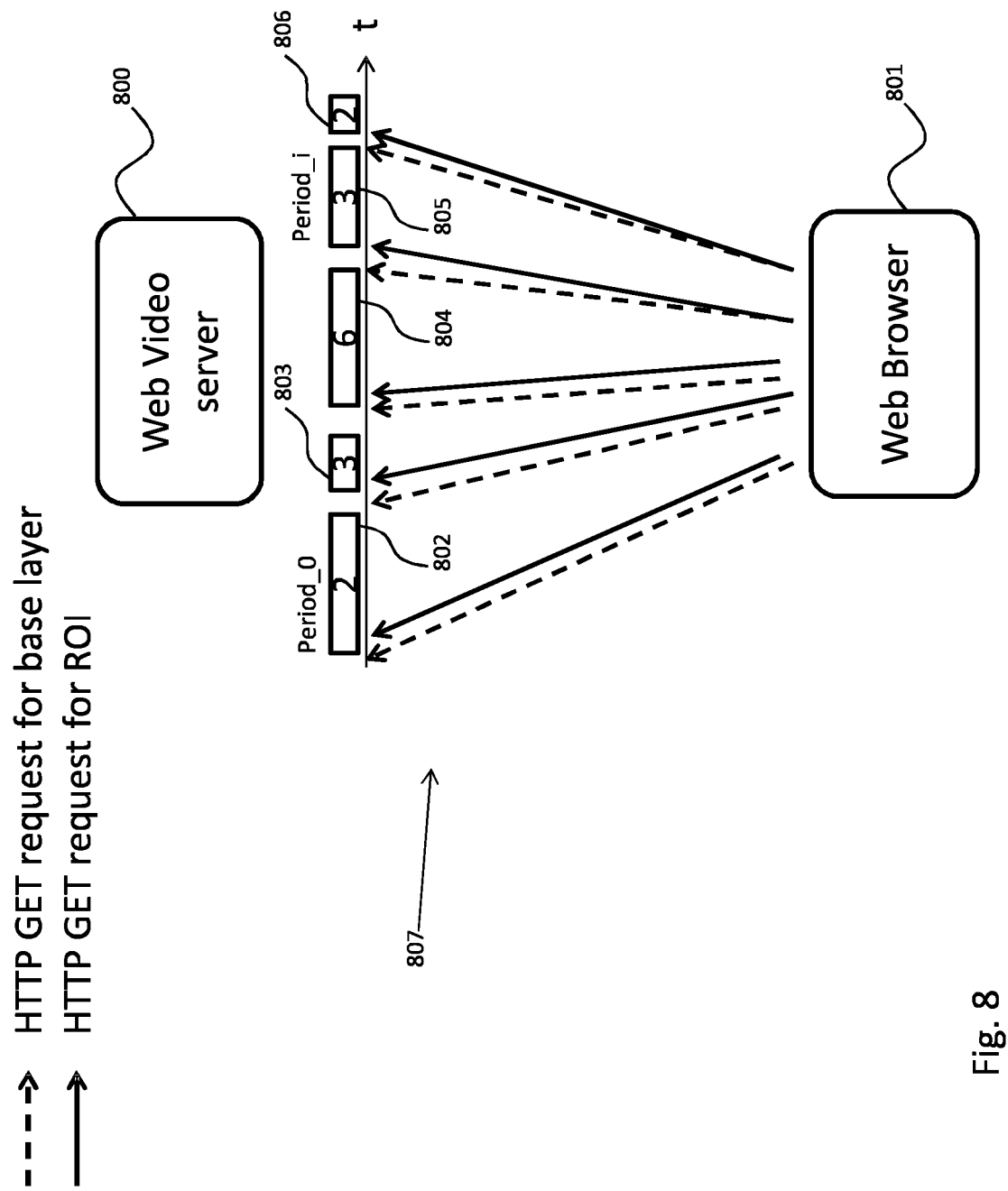
FIG. 8 illustrates the generation of the requests to retrieve at least one video segment according to the invention.

FIG. 8 is a simplified representation of the request exchange between a Web video server 800 and a Web Browser/client 801. In this example, it is assumed that the video is a scalable video with one base layer and at least one enhancement layer. In this example, the client requests a region of interest, which covers successively 2, 3, 6, 3 and 2 tiles. A segment 802, 803, 804, 805 and 806 respectively contains each new group of tiles. Each change relative to the number of covered tiles implies a new pair of client requests 807: one for the segment containing data for the base layer, one for the segment containing data for the covered tiles.

Some of segments 802, 804 and 806 are particularly long (in term of duration) compared to the others. This is due to the threshold Th previously mentioned, which prevents over-generation of segments oscillating between two or three tiles instead of the unique segment 802 for instance.

FIG. 9 is example of an MPD file according to an embodiment of the invention. Some specific "Representation" elements are introduced to define the segment 701 (see FIG. 7). The Representation element is extended with a specific attribute "region" that indicates the positions of the region covered by the transmitted tiles. The client can then decode the tiles and provides a superset of the ROI in higher quality on top of the base layer. Or it is up to the client, since it knows the selected area to crop the received data before display.

In this example, the elements that provide segmentation information according to the invention are (in bold letter):
a period start and a period duration, 901, 905 and 909 (909 being an optional attribute),
the description of the tiles (region) in terms of representation with its addressable segments: 903, 907 and 911,
the references to the segments involved for the concerned period, 902 (base layer), 904 (ROI segments) for Period 1, 906 (base layer), 908 (ROI) for Period 2, 910 (base layer) and 912 (ROI) for Period 3.

Figure 10:
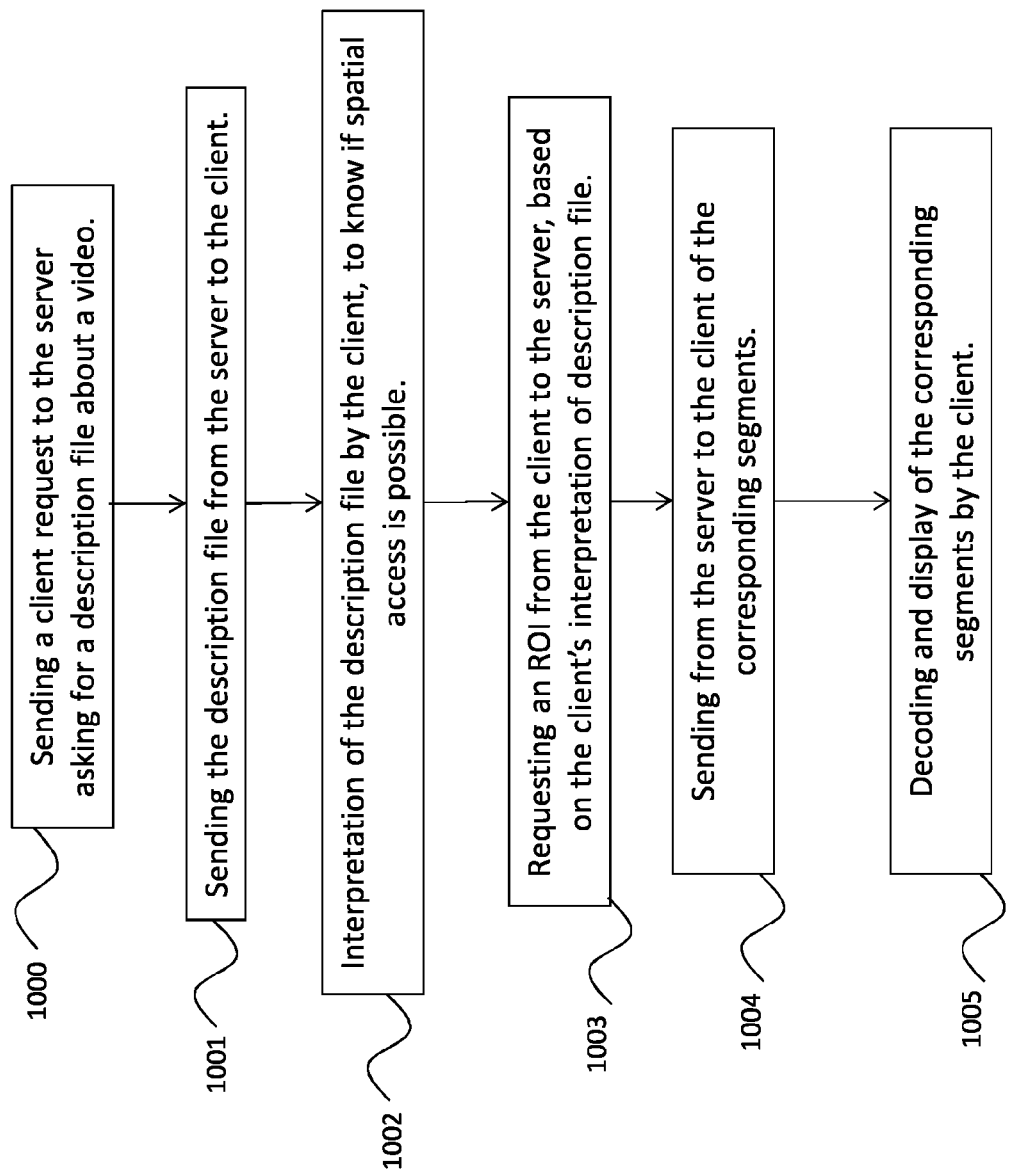
FIG. 10 shows a simplified block diagram which illustrates a streaming method according to the invention.

FIG. 10 is an example of a streaming method according to the invention. On first step 1000 a client sends a request to the server, asking for a description file (MPD) about a considered video sequence.

The server sends the requested description file to the client (step 1001).

This description file is interpreted by the client, in particular to know if spatial access is possible for this video sequence (step 1002).

The client can request a region of interest (ROI) from the server, based on his interpretation of the description file (step 1003). The regions of interest have been computed by the server according to one of the embodiments mentioned previously.

Then, the server sends the segments to the client, said segments corresponding to the client's request (step 1004).

Finally, the client can decode and display the segments that it received (step 1005).

Many further modifications and variations may be considered by persons skilled in the art upon making reference to the foregoing illustrative embodiments, which are given by way of example only and which are not intended to limit the scope of the invention, that being determined solely by the appended claims.

The invention claimed is:

1. A method for generating a description file for a client device to retrieve a video segment containing a region of interest from a video sequence at a server device, the method comprising for each video segment:
determining a time interval in the video sequence during which the region of interest is spatially included in a same frame region in the video sequence;
detecting a position of the region of interest in each frame of the video sequence by using an object content recognition method;
encapsulating the video sequence based on a position of the region of interest and the corresponding time interval; and
generating a description file comprising spatial information describing the frame region in the video sequence in which the region of interest is spatially included for the determined time interval and comprising temporal information describing a duration at least equal to the determined time interval.

2. The method according to claim 1, further comprising a coding step for compressing the video sequence, occurring before the encapsulating step.

3. The method according to claim 1, further comprising a coding step for compressing the video sequence, occurring at the same time as the encapsulating step.

4. The method according to claim 1, wherein the step of determining a time interval comprises:
determining a start frame in the video sequence in which the region of interest is spatially included in the frame region;
determining an end frame in the video sequence corresponding to the last frame in which the region of interest is still spatially included in the same frame region, all the consecutive frames between the start and the end frames having the region of interest spatially included in the same frame region;
determining start and end bounds of the determined time interval corresponding to the timing of the determined start and end frames.

5. The method according to claim 1, wherein the step of determining the end frame comprising considering each frames following the start frame one by one, and for the considered frame:
a) comparing the position of the region of interest in the considered frame with the position of the corresponding region of interest in the previous frame, and
b) if the compared positions of the region of interest are substandially the same then repeating the steps a) and b) with the following frame,
else if the compared positions are different, then the considered frame is the end frame of the current video segment.

6. The method according to claim 1, wherein the frame region corresponds to the smallest region including the region of interest in the start frame.

7. The method according to claim 1, wherein the determined time interval corresponds to the longest duration during which the region of interest is included in the frame region.

8. The method according to claim 1, wherein temporal information includes start time bound and end time bound of the duration.

9. The method according to claim 1, wherein spatial information includes spatial coordinates of the frame region.

10. The method according to claim 1, wherein the video sequence is encoded by independently decodable tiles, and wherein the spatial information includes index of the tiles covered by the region of interest.

11. The method according to claim 1, further comprising determining at least one additional time interval during which the region of interest overlaps outside the frame region by a predetermined fraction amount and wherein the duration described by the temporal information is the sum of the time interval and the additional time intervals.

12. The method according to claim 11, wherein said predetermined amount is a fraction of the region of interest inferior or equal to a predetermined threshold.

13. The method according to claim 12, wherein a tile is considered as being covered by a given region of interest if at least a predetermined number of successive frames comprising said given region of interest, include said tile.

14. The method according to claim 1, wherein the video sequence is a scalable video sequence, comprising one base layer and at least one enhancement layer.

15. The method according to claim 10, wherein the video sequence is a scalable video sequence, comprising one base layer and at least one enhancement layer which is encoded by independently decodable tiles.

16. The method according to claim 1, wherein the video comprises at least two independent bitstreams, a first bitstream with a lower resolution and a second bitstream with a higher resolution and which is encoded by independently decodable tiles.

17. A method for streaming video data corresponding to a video sequence from a server device to a client device, the method comprising:
receiving a first request from a client device requesting a description file about the video sequence, which comprises spatial and temporal information about the video sequence,
generating a description file according to claim 1,
transmitting the generated description file to the client,
receiving a second request from the client device,
requesting a video segment based on the information contained in the transmitted description file, and
streaming the video segment to the client device.

18. A non-transitory computer readable storage medium storing instructions of a computer program for carrying out each step of the method according to claim 1.

19. A device for generating a description file for a client device to retrieve a video segment and containing a region of interest from a video sequence at a server device, the method comprising for each video segment:
determining means for determining a time interval in the video sequence during which the region of interest is spatially included in a same frame region;
detecting means for preliminary detecting where the position of the region of interest in each frame of the video sequence is, by using an object content recognition method, and
encapsulating means for encapsulating the video sequence based on the region of interest's position and the corresponding time interval; and
generating means for generating a description file comprising spatial information describing the frame region in the video sequence in which the region of interest is spatially included for the determined time interval, and comprising temporal information describing a duration at least equal to the determined time interval.

20. The device according to claim 19, further comprising coding means for compressing the video sequence, the compression occurring before the encapsulation realized by the encapsulating means.

21. The device according to claim 20, further comprising coding means for compressing the video sequence, the compression occurring at the same time as the encapsulation realized by the encapsulating means.

22. The device according to claim 19, wherein the determining means for determining a time interval further comprises:
first determining means for determining a start frame in the video sequence in which the region of interest is spatially included in a frame region;
second determining means for determining an end frame in the video sequence corresponding to the last frame in which the region of interest is still spatially included in the same frame region, all the consecutive frames between the start and the end frames having the region of interest spatially included in the same frame region;
third determining means for determining start and end bounds of the determined time interval corresponding to the timing of the determined start and end frames.

23. The device according to claim 19, wherein the determining means for determining the end frame are able to consider each frame following the start frame one by one, and further comprising comparing means for comparing the position of the region of interest in the considered frame with the position of the corresponding region of interest in the previous frame.

24. The device according to claim 19, wherein the frame region corresponds to the smallest region including the region of interest in the start frame.

25. The device according to claim 19, wherein the determined time interval corresponds to the longest duration during which the region of interest is included in the frame region.

26. The device according to claim 19, wherein temporal information includes start time bound and end time bound of the duration.

27. The device according to claim 19, wherein spatial information includes spatial coordinates of the frame region.

28. The device according to claim 19, wherein video sequence is encoded by independently decodable tiles, and wherein the spatial information includes index of the tiles covered by the region of interest.

29. The device according to claim 19, further comprising determining means for determining at least one additional time interval during which the region of interest overlaps outside the frame region by a predetermined fraction amount and wherein the duration described by the temporal information is the sum of the time interval and the additional time intervals.

30. The device according to claim 28, wherein said predetermined amount is a fraction of the region of interest inferior or equal to a predetermined threshold.

31. The device according to claim 30, wherein a tile is considered as being covered by a given region of interest if at least a predetermined number of successive frames comprising said given region of interest, include said tile.

32. The device according to claim 19, wherein the video sequence is a scalable video sequence, comprising one base layer and at least one enhancement layer.

33. The device according to claim 19, wherein the video sequence is a scalable video sequence, comprising one base layer and at least one enhancement layer which is encoded by independently decodable tiles.

34. The device according to claim 19, wherein the video comprises at least two independent bitstreams, a first bitstream with a lower resolution and a second bitstream with a higher resolution and which is encoded by independently decodable tiles.

35. A server device for streaming video data corresponding to a video sequence to a client device, the server device comprising:
receiving means for receiving a first request from a client device requesting a description file about the video sequence, which comprises spatial and temporal information about the video sequence,
generating means for generating a description file according to the means of claim 19,
transmitting means for transmitting the generated description file to the client, receiving means for receiving a second request from the client device,
requesting a video segment based on the information contained in the transmitted description file, and
streaming means for streaming the video segment to the client device.

* * * * *